Dec. 28, 1926.

A. B. LAFTMAN 1,612,295

MUFFLING LITHOPONE

Filed Sept. 24, 1925

Axel Bertil Laftman
Inventor

Attorneys

Patented Dec. 28, 1926.

1,612,295

UNITED STATES PATENT OFFICE.

AXEL BERTIL LAFTMAN, OF GRASSELLI, NEW JERSEY, ASSIGNOR TO THE GRASSELLI CHEMICAL COMPANY, OF CLEVELAND, OHIO, A CORPORATION OF OHIO.

MUFFLING LITHOPONE.

Application filed September 24, 1925. Serial No. 58,344.

In the manufacture of lithopone, it has heretofore been the practice to calcine the raw or crude lithopone in muffles from which it is raked out into a quenching tank full of water. The lithopone coming from the muffle is at a red-heat and is very readily oxidized.

I have discovered that this oxidation may be obviated by spraying the red-hot material as it leaves the door of the furnace and while passing over the furnace apron, with water in quantity to sufficiently wet such material.

As the result of such spraying with water, not only is the material cooled quickly below the critical temperature of oxidation, but there is produced a blanket of steam which keeps the air away from the mass until it falls into the water where it is completely quenched.

Incidental advantages resulting from my new method are the obviation of dust losses which occur when dry, unquenched and hot material is dropped from the apron into the quenching water, and also the absorption of gases discharged from the furnace, thus improving the working conditions for the operators.

Figure 1:
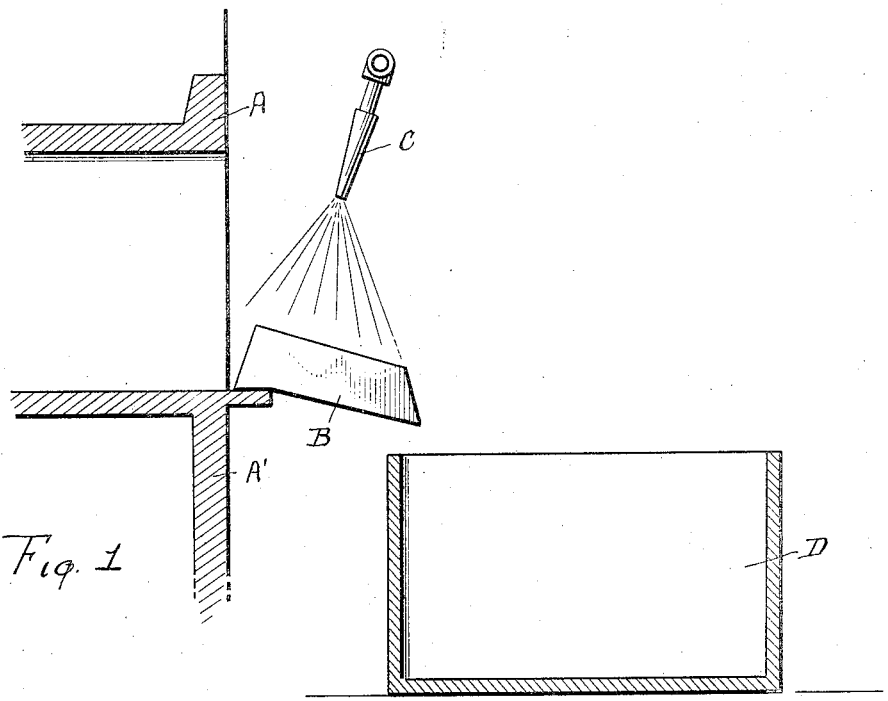
Figure 2:
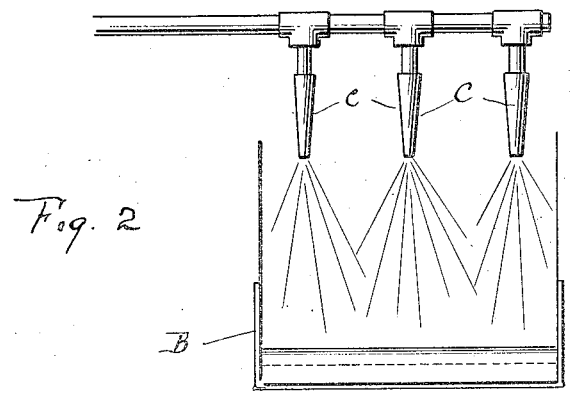

The mode of operation will be readily understood from the accompanying diagrammatic drawings in which:

Fig. 1 is a sectional elevation; and
Fig. 2 is an end elevation.

The walls of the muffle are shown at A and A'. In front of the opening is a pan B, and C, CC are water spraying pipes. D is the usual quenching tank or buggy. The red-hot material in a layer of from 12 to 15 inches deep is raked out of the furnace over the apron, where it is subjected to the sprays of water from pipes C, C, C; and then drops into the quenching buggy D where it is completely quenched.

I claim:

An improvement in muffling lithopone which consists in spraying with water the hot calcined mass as it leaves the furnace, and then dropping it into a quenching body of water.

In testimony whereof, I affix my signature.

AXEL BERTIL LAFTMAN.